United States Patent [19]
Weyer et al.

[11] Patent Number: 5,741,888
[45] Date of Patent: Apr. 21, 1998

[54] REMOVAL OF HETEROPOLY COMPOUNDS FROM POLYETHERS, POLYESTERS AND POLYETHER ESTERS

[75] Inventors: Hans-Jürgen Weyer, Bobenheim-Roxheim; Rolf Fischer, Heidelberg, both of Germany

[73] Assignee: BASF Aktiengesellschaft, Ludwigshafen, Germany

[21] Appl. No.: 809,689

[22] PCT Filed: Oct. 6, 1995

[86] PCT No.: PCT/EP95/03956

§ 371 Date: Mar. 27, 1997

§ 102(e) Date: Mar. 27, 1997

[87] PCT Pub. No.: WO96/11222

PCT Pub. Date: Apr. 18, 1996

[30] Foreign Application Priority Data

Oct. 7, 1994 [DE] Germany .................. 44 35 934.9

[51] Int. Cl.$^6$ .................. C08F 6/00; C08J 3/00
[52] U.S. Cl. .................. 528/494; 528/482; 528/488; 528/494
[58] Field of Search .................. 528/482, 488, 528/494

[56] References Cited

U.S. PATENT DOCUMENTS 5,414,143  5/1995  Weyer et al. .................. 568/617

FOREIGN PATENT DOCUMENTS

| 000 944 | 3/1979 | European Pat. Off. . |
| 126471 | 11/1984 | European Pat. Off. . |
| 158229 | 10/1985 | European Pat. Off. . |
| 181621 | 5/1986 | European Pat. Off. . |
| 503394 | 2/1992 | European Pat. Off. . |
| 58083028 | 11/1981 | Japan . |
| 61-200120 | 3/1985 | Japan . |
| 1754732 | 11/1989 | U.S.S.R. . |
| 1369304 | 10/1974 | United Kingdom . |

OTHER PUBLICATIONS

AOSHIMA et al., (Japanese title), No. 3, 1990, pp. 234–242.

*Primary Examiner*—Samuel A. Acquah
*Attorney, Agent, or Firm*—Keil & Weinkauf

[57] ABSTRACT

A method of removing heteropoly compounds from polyethers, polyesters and/or polyether esters, which are contaminated with heteropoly compounds is described, which comprises adding, to the polymers or a solution thereof, an ether whose polarity is so low that its addition leads to the deposition of the heteropoly compound in a separate phase, and separating off the precipitated heteropoly compound phase. The polymer phase which remains is preferably purified further using a solid adsorbent.

14 Claims, No Drawings

REMOVAL OF HETEROPOLY COMPOUNDS FROM POLYETHERS, POLYESTERS AND POLYETHER ESTERS

The invention relates to a method of removing heteropoly compounds from polyethers, polyesters and polyether esters, or solutions thereof, which comprise such heteropoly compounds, by mixing them with an ether whose polarity is so low that its addition leads to the deposition in a separate phase of the heteropoly compound present in the polymer phase.

Polyethers, polyesters and polyether esters are employed widely, for example in hydraulic fluids or as a diol component in the preparation of polyurethanes. They are prepared by cationic polymerization or copolymerization of appropriate monomers, such as, for example, cyclic ethers, acetals, polyalcohols or lactones, with the aid of Brönstedt or Lewis acid catalysts. Catalysts which have proven particularly advantageous for a ring-opening polymerization are heteropoly acids and heteropoly acid salts, referred to collectively below as heteropoly compound(s) or HPA. For establishing the desired polymer molar mass and/or for preparing specific, endgroup-modified derivatives, it is common for substances to be present during polymerization whose incorporation leads directly or indirectly to chain termination. Examples of such substances are carboxylic acid derivatives, alcohols and water.

JP-A-83 028/1983 describes, for example, the polymerization of tetrahydrofuran (THF) in the presence of a carboxylic anhydride or carbonyl halide to form polyTHF diesters, in which a heteropoly acid is used as catalyst.

EP 126 471 discloses the HPA-catalyzed polymerization of THF and the copolymerization of THF with various other cyclic ethers in the presence of water to form polyether glycols. EP 158 229 describes the preparation of polyether glycols by copolymerization of cyclic ethers with difunctional and higher polyfunctional alcohols.

According to JP 61-200120, lactones can be polymerized, alone or together with cyclic ethers, in the presence of hydroxyl-containing compounds and using heteropoly acids as catalysts.

In accordance with EP 503 393 and EP 503 394, polyether glycol monoethers and polyether glycol monoesters can be prepared by polymerizing cyclic ethers in the presence of monoalcohols or monocarboxylic acids and with HPA catalysts.

These polymerization processes for preparing polyethers, polyesters and polyether esters are accompanied by the formation of polymer phases which, owing to incomplete reaction, still include residues of monomer(s), of compound(s) leading to chain termination, any solvents employed, and dissolved heteropoly compound(s). The percentage amount of HPA catalyst dissolved in the polymer phase is considerable with these reactions and may be up to 1% by weight or more, based on the polymer phase. If separation is configured merely as a distillation to remove unreacted monomer, chain termination reagent (s) and any solvent employed from this phase, then the dissolved catalyst is not precipitated out but remains in dissolved form in the polymer. On the one hand, this must be prevented on quality grounds; on the other hand, it is desirable for reasons of cost—since heteropoly acids are very expensive—to recover the majority of the catalyst.

It is also known that heteropoly compounds break down over time, a process which is intensified under thermal stress. Such breakdown occurs principally by hydrolysis, to form the corresponding oxides. The breakdown of heteropoly compounds can be slowed down, or even entirely prevented, by means, inter alia, of the addition of an ether, as has been described, for example, by A. Aoshima, S. Yamamatsu and T. Yamaguchi in Nippon Kagaku Kaishi (1990) 233.

To solve the problem of the separation of heteropoly compounds, EP 181 621 proposes the addition to the polymer phase of a hydrocarbon or halogenated hydrocarbon, whereby the majority of the dissolved heteropoly acid is precipitated and/or deposited as a separate phase. The separated hydrocarbon/polymer phase is subsequently treated with a solid adsorbent. Stabilization of the heteropoly compounds, however, is not achieved by the precipitation with a (possibly halogenated) hydrocarbon in this process.

In SU 1754732 A1, concentration of the polymer phase to 50–90% polymer is likewise followed by the addition of a hydrocarbon of 1–15 carbon atoms in order to precipitate the heteropoly compound. Instead of further purification by adsorption, however, a liquid organic nitrogen base is then added, which together with remaining heteropoly compound—which in this case must refer to the acid—forms an insoluble salt which precipitates and can be separated off in a conventional manner. The purity of about $50 \times 10^{-6}\%$ heteropoly compound in the polymer which can be achieved by this means is, nevertheless, inadequate for the majority of applications.

It is an object of the present invention, accordingly, to find a method of purifying polyethers, polyesters and/or polyether esters, or solutions thereof, which comprise heteropoly compounds, which method is able to separate off the heteropoly compounds and at the same time can be used to stabilize the HPA employed.

We have found that this object is achieved by a method of removing heteropoly compounds from polyethers, polyesters and/or polyether esters, which are contaminated with heteropoly compounds, which method comprises taking these polymers or a solution thereof and adding an ether whose polarity is so low that its addition leads to the deposition in a separate phase of the heteropoly compound from the polymer phase.

In accordance with the novel method it is possible to purify polyethers, polyesters and/or polyether esters from heteropoly compound(s). In this context, the purification method described can be employed for any mixture comprising HPA and the abovementioned polymers.

The abovementioned polymeric compounds may be composed, for example, of monomers from the group consisting of cyclic ethers, acetals, diols, higher alcohols and lactones. However, it is also possible for polymeric compounds consisting of other monomers to be freed from dissolved heteropoly compounds by the novel method. The molar mass of the polyethers, polyesters and/or polyether esters to be purified is not subject to any restriction, but is preferably below 5000.

The polyethers, polyesters and/or polyether esters comprising heteropoly compound(s) are employed as they are or in dissolved form, for example and preferably in the solution thereof as obtained in the polymerization. In this description and the claims, the terms polymer phase and (polymer) mixture refer to a phase comprising at least one of the above polymers, while the term polymer solution refers to a phase which still, in addition, includes a low molecular mass organic component acting as solvent.

The polymerization process itself is of little importance to the novel purification of polyethers, polyesters and/or polyether esters. The polymerization can be carried out continuously or batchwise, and the polymerization system may, for example, comprise one or two phases or be heterogeneous.

In general, the polymer solution which is formed in the polymerization still includes a considerable proportion of monomer(s), a large amount of the initially added chain termination reagent(s), and dissolved heteropoly compound (s). Since it may be advantageous to carry out the polymerization in the presence of a solvent, the polymerization system may also include one.

In a preferred polymerization process with HPA catalysis, operation is such as to give a polymerization mixture having two liquid phases, a catalyst phase and a monomer/polymer phase. A typical monomer/polymer phase, as obtained, for example, in the ring-opening polymerization of THF to polytetrahydrofuran (polyTHF) in the presence of water using $H_3PW_{12}O_{40}$ as catalyst in a two-phase polymerization system, has the following composition (in % by weight): 77.3% THF, 21.2% polyTHF, 1.2% $H_3PW_{12}O_{40}$, 0.3% water.

The composition of the polymer phase which is used for the novel process therefore depends on the nature of the catalyst, of the monomer or monomers, of the chain terminating reagent or reagents, and on the content of any solvent used, and is not critical for the method.

In accordance with the novel method, for purifying the HPA-containing polymer phase an ether is added whose polarity is so low that its addition to the HPA-contaminated polymer phase leads to the precipitation of HPA from this phase. It is preferred to use ethers whose dipole moment is less than 1.4 D.

Apart from this, the nature of the ether is arbitrary. Thus it is possible, for example, for a simple ether to have identical or different carbon-containing radicals, which radicals may also be linked to one another to form a ring. The carbon-containing radicals may be alkyls, cycloalkyls, alkenyls, cycloalkenyls, aryls and/or aralkyls which are unsubstituted or substituted by halogen (F, Cl, Br, I) or by groups comprising one or more heteroatoms (N, O, S). Examples of such ethers include diethyl ether, methyl tert-butyl ether, di-tert-butyl ether, dibutyl ether, dioctyl ether, dicyclohexyl ether, dibenzyl ether and anisole.

By choosing appropriate carbon-containing radicals it is possible to tailor the ether used for HPA precipitation optimally to the respective polyether, polyester and/or polyether esters to be purified.

To simplify the novel method it is preferred to employ ethers which are liquid at room temperature and are stable and easy to handle under the reaction conditions.

The amount by weight of the ether to be employed depends on the HPA content and on the content of other low molecular mass compounds, such as monomer(s), chain termination reagent(s), solvent, etc., in the polymer phase which is to be purified, but is normally at least as much as, frequently up to twice as much as, the total amount by weight of the other low molecular mass compounds. Based on the amount of polyether, polyester and/or polyether ester, the amount of heteroelement compound should in general be 50% by weight or more, preferably 100% by weight or more.

Where large amounts of low molecular mass compounds are present together with the polymer which is to be purified, large amounts of the ether must likewise be added in order to precipitate the HPA. It may therefore be advantageous to concentrate a polymer-containing mixture to a polymer content of at least 10% or, preferably, at least 50% by weight or more before adding the ether which is used for precipitation.

With the novel addition of the ether, the major proportion of the HPA dissolved in the polymer phase is precipitated. It may be advantageous here to mix the polymer phase thoroughly in an appropriate manner, for example by conventional stirring. HPA removal is carried out using temperatures and pressures which are chosen so as to make the method easy to implement. The temperatures used should not be too high, since the solubility of the HPA in the polymer phase increases as the temperature rises; temperatures from 25° to 60° C. are normally chosen. To complete the precipitation, the mixture can be left to stand for from 0.1 to 200 hours, half an hour usually being sufficient. In many cases, the formation of emulsions is observed. In this case phase separation can be accelerated by appropriate measures (for example, the use of coalescing filters).

The novel method succeeds in separating the major proportion of the HPA dissolved in the polyether, polyester and/or polyether ester phase. The HPA is usually obtained in a liquid phase which can be recycled directly to the polymerization stage. Owing to the presence of small amounts of the ether precipitant in the separated HPA phase, the latter is stabilized.

If, for example, the abovementioned THF/polyTHF phase obtained in the course of THF polymerization in the presence of water with $H_3PW_{12}O_{40}$ as catalyst is admixed with twice the amount by weight of dioctyl ether, the major proportion of the dissolved HPA is deposited in the form of a liquid phase. In this case the residual content of HPA in the THF/polyTHF/dioctyl ether phase falls to 5 ppm.

The processes which take place in the course of HPA precipitation by the addition of ether have not yet been elucidated in every detail. A possible mode of action might be that the addition of an ether of relatively low polarity greatly reduces the solubility of heteropoly compounds in the polymer phase, by reducing the polarity thereof, so that these compounds precipitate from the polymer phase.

The term heteropoly acids refers, for the purposes of the present invention, to inorganic polyacids having at least two different central atoms, which form from weak, polybasic oxyacids of a metal, preferably from those of chromium, molybdenum, vanadium and tungsten, and/or from the corresponding oxides in these metals, for example $CrO_3$, $MoO_3$, $V_2O_5$ or $WO_3$, and from those of a different metal or nonmetal, for example arsenic, boron, iodine, phosphorus, selenium, silicon, germanium or tellurium as mixed, partial anhydrides. In general the atomic ratio of the former elements to the latter elements in these heteropoly acids is from 2.5 to 12, preferably 9 or 12.

Examples of heteropoly acids as can be removed in the novel method are:

dodecamolybdatophosphoric acid ($H_3PMo_{12}O_{40} \times nH_2O$), dodecamolybdatosilicic acid ($H_4SiMo_{12}O_{40} \times nH_2O$), dodecamolybdatocerium(IV) acid ($H_8CeMo_{12}O_{42} \times nH_2O$), dodecamolybdatoarsenic(V) acid ($H_3AsMo_{12}O_{40} \times nH_2O$), hexamolybdatochromium(III) acid ($H_3CrMo_6O_{24}H_6 \times nH_2O$), hexamolybdatonickel(II) acid ($H_4NiMo_6O_{24}H_6 \times 5H_2O$), hexamolybdatoiodine acid ($H_5IMo_6O_{24} \times nH_2O$), octadecamolybdatodiphosphoric acid ($H_6P_2Mo_{18}O_{62} \times 11H_2O$), octadecamolybdatodiarsenic(V) acid ($H_6As_2Mo_{18}O_{62} \times 25H_2O$), nonamolybdatomanganese(IV) acid ($H_6MnMo_9O_{32} \times nH_2O$), undecamolybdatovanadatophosphoric acid ($H_4PMo_{11}VO_{40} \times nH_2O$).

decamolybdatodivanadatophosphoric acid ($H_5PMo_{10}V_2O_{40} \times nH_2O$), dodecavanadatophosphoric acid ($H_7PV_{12}O_{36} \times nH_2O$), dodecatungstosilicic acid ($H_4SiW_{12}O_{40} \times 7H_2O$), dodecatungstophosphoric acid ($H_3PW_{12}O_{40} \times nH_2O$), dodecatungstoboric acid ($H_5BW_{12}O_{40} \times nH_2O$), octadecatungstodiphosphoric acid ($H_6P_2W_{18}O_{62} \times 14H_2O$), octadecatungstodiarsenic(V) acid ($H_6As_2W_{18}O_{62} \times 14H_2O$), hexamolybdatohexatungstophosphoric acid ($H_3PMo_6W_6O_{40} \times nH_2O$).

It is of course also possible to remove mixtures of heteropoly acids. The novel method is often used to remove dodecatungstophosphoric acid, dodecatungstosilicic acid and/or dodecamolybdatosilicic acid, since these are employed with preference as catalysts owing to their ready availability.

The novel method is used with particular preference for the purification of polymers in whose preparation processes the free heteropoly acids have been employed as catalysts. However, the separation of alkali metal and/or alkaline earth metal salts of heteropoly acids is also possible.

Polyethers, polyesters and polyether esters with an HPA content reduced as described above can be purified further by bringing them into contact with a solid adsorbent. In this case these polymers can be treated directly or in solution with the solid adsorbent. Preference is given to the use of monomer/polymer mixtures which still, if appropriate, contain solvent. These mixtures can be employed just as obtained from the HPA precipitation stage or else in more concentrated or dilute form. The amount of monomer advantageously present in the polymer phase should be at least 10% by weight, preferably 50% by weight or more.

There is no restriction on the nature of the solid adsorbent, provided it is able to adsorb heteropoly compounds. Activated carbons, aluminas, oxides, hydroxides and carbonates of alkaline earth metals and rare earth metals, and also basic ion exchangers, are preferred. The amount of adsorbent depends on the HPA content and can be from 2 to 5000 times, preferably from 10 to 1000 times, the amount of dissolved HPA. In general, the use of relatively large amounts of solid adsorbent leads to a lower residual content of HPA following the treatment.

The temperature during this purification stage is subject to no particular restriction and should be chosen such that the solution to be treated has an appropriate viscosity. Where a polyether with a mean molar mass of 1000 is employed in pure form, the appropriate temperature is normally from 20° to 150° C., preferably from 30° to 100° C.

If, after treatment with a solid adsorbent, the purified polymer still contains monomer or solvent, these can be removed, for example, by distillation under atmospheric pressure or reduced pressure, making it possible to obtain a polymer with a very low HPA content of possibly less than 1 ppm, based on pure polyether, polyester and/or polyether ester. Accordingly, it is possible by the novel method to obtain polyethers, polyesters and/or polyether esters in high purity in an economic fashion.

All concentration data in the illustrative Examples below are in % by weight. The experiments were all carried out under nitrogen. Quantitative analysis of the heteropoly acids was by means of X-ray fluorescence and atomic absorption.

EXAMPLE 1

A polymer phase obtained in the polymerization of tetrahydrofuran (THF) to polytetrahydrofuran (polyTHF) in the presence of water using $H_3PW_{12}O_{40}$ as catalyst was employed, which had the following composition: THF (77.3%), polyTHF (21.2%), $H_3PW_{12}O_{40}$ (1.2%), water (0.3%).

200 g of dioctyl ether were added to 100 g of this mixture. After 30 minutes, the major proportion of the previously dissolved $H_3PW_{12}O_{40}$ had precipitated in the form of a liquid mixture and could be separated off. The THF/polyTHF/dioctyl ether phase still had a residual content of 5 ppm of $H_3PW_{12}O_{40}$. Then 20 g of active carbon (Merck) were added to the organic phase, and the mixture was shaken at room temperature for 4 hours. The $H_3PW_{12}O_{40}$ content of the polyTHF obtained following removal of the activated carbon and concentration of the remainder of the mixture under reduced pressure was less than 1 ppm.

EXAMPLES 2–6

For each of Examples 2–6, 100 g of a THF/polyTHF/HPA solution were employed whose composition is indicated in Tab. I. The ether ("purifying compound") was added to this mixture, and after 50 hours the residual content of HPA in the mixture was determined. 20 g of activated carbon were then added to each sample, and the samples were shaken at room temperature for 4 hours and concentrated under 10 mbar/140° C. Analysis of the resulting polyTHF revealed a residual HPA content of less than 1 ppm.

TABLE I

| | Composition of the solution | | | Purifying compound | | Residual HPA |
|---|---|---|---|---|---|---|
| Ex. | THF | polyTHF [% by wt.] | HPA | Nature | Amount [g] | content [ppm] |
| 2 | 77.3 | 21.2 | 1.2 | diethyl ether | 200 | 10 |
| 3 | 77.3 | 21.2 | 1.2 | dipropyl ether | 200 | 9 |
| 4 | 77.3 | 21.2 | 1.2 | dibutyl ether | 200 | 7 |
| 5 | 77.3 | 21.2 | 1.2 | dipentyl ether | 200 | 8 |
| 6 | 77.3 | 21.2 | 1.2 | dihexyl ether | 200 | 6 |

We claim:

1. A method of removing heteropoly compounds from polymers, polyesters and/or polyether esters, which are contaminated with heteropoly compounds, which comprises adding, to the polymers or a solution thereof, an ether whose polarity is so low that its addition leads to the deposition of the heteropoly compound in a separate phase, and separating off the precipitated heteropoly compound phase.

2. A method as defined in claim 1, wherein an ether of the formula $R_1$—O—$R_2$ is used, in which $R_1$ and $R_2$ are unsubstituted or substituted alkyl, cycloalkyl, alkenyl, cycloalkenyl, aryl or aralkyl which are identical or different and may be linked to one another to form a cyclic radical.

3. A method as defined in claim 1, wherein the ether is a dialkyl ether.

4. A method as defined in claim 1, wherein the ether is a branched-chain dialkyl ether.

5. A method as defined in claim 1, wherein the ether is in liquid form under standard conditions.

6. A method as defined in claim 1, wherein the amount by weight of ether added is at least 50% of the amount by weight of polymer present.

7. A method as defined in claim 1, wherein a solution of the polymers is concentrated to a polymer content of at least 10% by weight, before the ether is added.

8. A method as defined in claim 1, wherein after the heteropoly compound phase has been separated off the polymer is brought into contact with a solid adsorbent which absorbs heteropoly compounds.

9. A method as defined in claim 1, wherein a solid adsorbent or a mixture of two or more solid adsorbents selected from the group consisting of activated carbons, aluminas, alkaline earth metal and rare earth metal oxides, hydroxides and carbonates, and basic ion exchangers is employed.

10. A method as defined in claim 1 wherein after the heteropoly compounds have been removed the polymer is obtained by separation from the remaining reaction mixtures.

11. A method as defined in claim 1, wherein a polyether is employed which includes polyoxytetramethylene groups.

12. A method as defined in claim 1, wherein the separated heteropoly compound phase is reused as polymerization catalyst.

13. A method as defined in claim 3, wherein the ether is a branched-chain dialkyl ether.

14. A method as defined in claim 7, wherein the polymer content is 50% by weight.

* * * * *